United States Patent [19]

Torok et al.

[11] 4,350,539

[45] Sep. 21, 1982

[54] METHOD OF IMPROVING THE DUCTILITY OF THE COATING OF AN ALUMINUM-ZINC ALLOY COATED FERROUS PRODUCT

[75] Inventors: Theodore E. Torok, Springtown; Paik W. Shin, Coopersburg; Angelo R. Borzillo, Norristown, all of Pa.

[73] Assignee: Bethlehem Steel Corporation, Bethlehem, Pa.

[21] Appl. No.: 267,132

[22] Filed: May 26, 1981

Related U.S. Application Data

[62] Division of Ser. No. 92,786, Nov. 8, 1979, Pat. No. 4,287,008.

[51] Int. Cl.³ .............................................. B32B 15/01
[52] U.S. Cl. ................................... 148/31.5; 428/653
[58] Field of Search .................... 148/11.5 R, 11.5 Q, 148/12 R, 12 C, 12 D, 31.5, 127, 134; 427/433, 483.9, 320, 321; 428/653; 204/37 R

[56] References Cited

U.S. PATENT DOCUMENTS

| | | | |
|---|---|---|---|
| 3,028,269 | 4/1962 | Beattie et al. | 428/653 X |
| 3,297,499 | 1/1967 | Mayhew | 148/134 |
| 3,343,930 | 9/1967 | Borzillo et al. | 428/653 X |
| 3,652,321 | 3/1972 | Hood | 427/320 X |
| 3,952,120 | 4/1976 | Horton et al. | 428/653 X |
| 4,036,600 | 7/1977 | Kimura et al. | 428/653 X |
| 4,053,663 | 10/1977 | Caldwell et al. | 427/321 X |
| 4,104,088 | 8/1978 | Batz | 427/383.9 X |
| 4,144,379 | 3/1979 | Patil et al. | 428/653 |

Primary Examiner—Peter K. Skiff
Attorney, Agent, or Firm—Joseph J. O'Keefe; William B. Noll

[57] ABSTRACT

This invention relates to an aluminum-zinc alloy coated ferrous product whose coating is highly ductile, and to the method whereby such improved coating ductility may be realized. The process is characterized by the steps of thermally treating the aluminum-zinc alloy coated product by heating to a temperature between about 200° F. (93° C.) and 800° F. (427° C.) and holding for a period of time to effect metallurgical structure changes, among them being the precipitation of a second phase incoherent with the matrix, followed by slow cooling to at least 400° F. (205° C.). The resulting product is characterized by an aluminum-zinc alloy coating with a hardness no greater than about 115 VHN, and preferably no greater than about 110 VHN.

2 Claims, 1 Drawing Figure

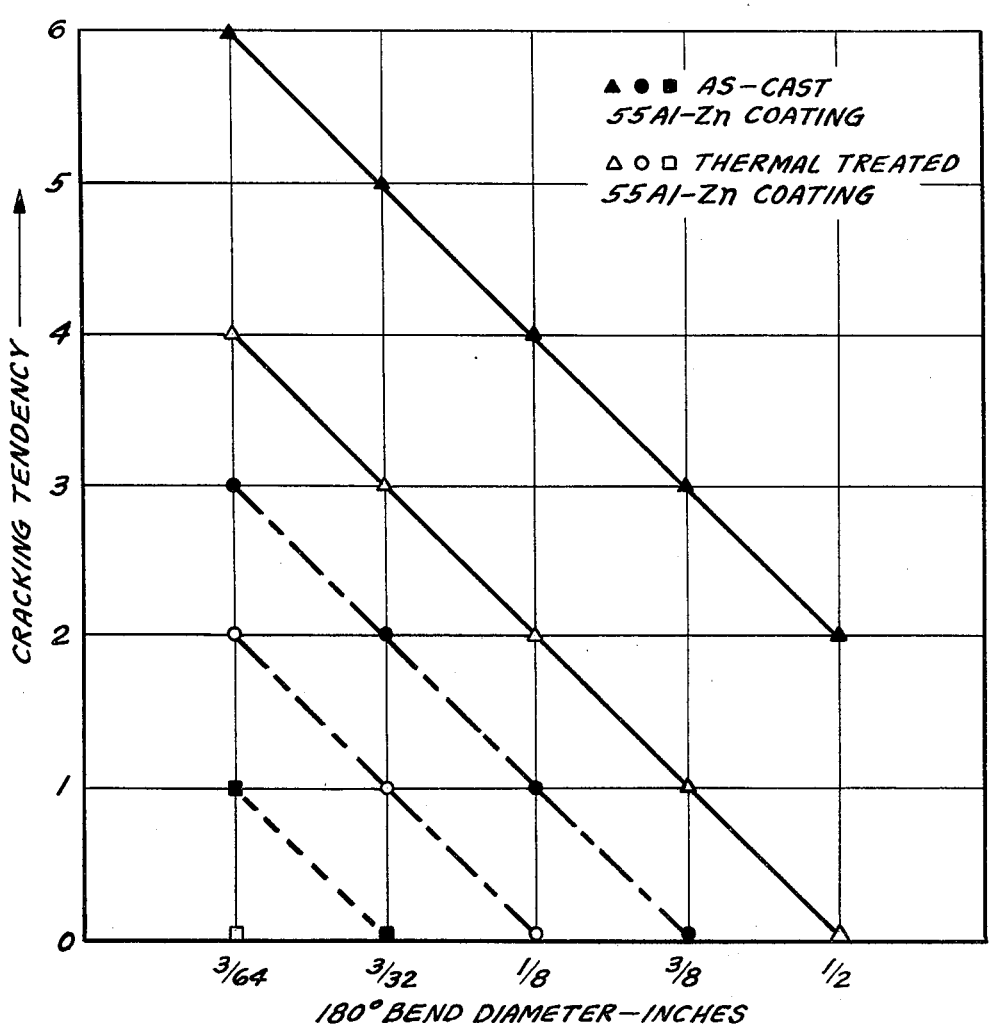

METHOD OF IMPROVING THE DUCTILITY OF THE COATING OF AN ALUMINUM-ZINC ALLOY COATED FERROUS PRODUCT

This is a division of application Ser. No. 92,786, filed Nov. 8, 1979, now U.S. Pat. No. 4,287,008.

DESCRIPTION

1. Related Application

This application is related to U.S. Ser. No. 267,134, filed concurrently herewith, entitled "Method of Producing an Aluminum-Zinc Alloy Coated Ferrous Product to Improve Corrosion Resistance", and assigned to the assignee of this application.

2. Technical Field

This invention is directed to the field of metallic coated ferrous products, particularly sheet and strip, where the metallic coating provides a barrier and sacrificial type protection to the underlying ferrous base. Preferably this invention relates to continuous steel strip, coated with aluminum-zinc alloy which has been subjected to a thermal treatment and thereby improve the ductility of the coating.

BACKGROUND OF THE PRIOR ART

Since the discovery of the use of metallic coatings on ferrous products as a means to deter corrosion of the underlying base, investigators have continuously sought to perfect improvements in coated products to prolong their life or to broaden their scope of application. Such attempts at improvement have followed many avenues. One of the most notable metallic coatings is zinc, exemplified by the widespread use of galvanized steel.

Galvanized steel is produced in a variety of conditions, namely unalloyed, partially alloyed or fully alloyed with the steel base, with a number of different surface finishes. All such varieties and/or finishes were the result of investigators seeking improvements in the coated product.

U.S. Pat. No. 2,110,893 to Sendzimir teaches a continuous galvanizing practice which is still followed today. The Sendzimir practice includes passing a steel strip through a high temperature oxidizing furnace to produce a thin film of oxide coating on the steel strip. The strip is then passed through a second furnace containing a reducing atmosphere which causes a reduction of the oxide coating on the surface of the steel strip and the formation of a tightly adherent impurity-free iron layer on the steel strip. The strip remains in the reducing atmosphere until it is immersed in a molten zinc bath maintained at a temperature of about 850° F. (456° C.). The strip is then air cooled, resulting in a bright spangled surface. The coating is characterized by a thin iron-zinc intermetallic layer between the steel base and a relatively thick overlay of free zinc. The thus coated product is formable, but presents a surface that is not suitable for painting due to the presence of spangles.

To produce a non-spangled surface which is readily paintable, a process known as galvannealing was developed. The processes described in U.S. Pat. No. 3,322,558 to Turner, and U.S. Pat. No. 3,056,694 to Mechler are representative of such a process. In the galvannealing process, the zinc coated strip is heated, just subsequent to immersion of the steel strip in the zinc coating bath, to above the melting temperature of zinc, i.e. about 790° F. (421° C.), to accelerate the reaction of zinc with the coating base steel. This results in the growth of the intermetallic layer from the steel base to the surface of the coating. Thus, a characteristic of galvannealed strip is a fully alloyed coating and the absence of spangles.

One area of interest that has garnered the attention of investigators was the need to improve the formability of the coated product. U.S. Pat. No. 3,297,499 to Mayhew, U.S. Pat. No. 3,111,435 to Graff et al and U.S. Pat. No. 3,028,269 to Beattie et al are each directed to improving the ductility of the steel base in a continuous galvanized steel. Mayhew's development subjects the galvanized strip to an in-line anneal at temperatures between about 600° to 800° F. (315° to 427° C.) followed by cooling and hot coiling. This treatment is intended to decrease the hardness of the steel base and increase its ductility without causing damage to the metal coating. The Graff and Beattie patents effect the same result with a box anneal treatment at temperatures between about 450° to 850° F. (232° to 455° C.). Finally, the same end result, i.e. improved steel base ductility, in this case for an aluminum clad steel base, is taught by U.S. Pat. No. 2,965,963 to Batz et al. The Batz et al. patent teaches heating an aluminum clad steel at temperatures in the range of 700° to 1070° F. (371° to 577° C.). Characteristic features of the processes of each of the preceding patents directed to post annealing of the coated product is to effect changes in the base steel without any recognizable metallurgical effect on the coating itself or on any improvements thereof.

The search for improved metallic coated products has not been limited to investigations of existing products. This was evidenced by the introduction of a new family of coated products, namely aluminum-zinc alloy coated steel, described, for example, in U.S. Pat. No. 3,343,930 to Borzillo et al, U.S. Pat. No. 3,393,089 to Borzillo et al, U.S. Pat. No. 3,782,909 to Cleary et al, and U.S. Pat. No. 4,053,663 to Caldwell et al. The inventions described in such patents, directed to aluminum-zinc alloy coated steel, represented a dramatic departure from past materials and practices, as the aluminum-zinc alloy coating is characterized by an intermetallic layer and an overlay having a two-phase rather than a single phase structure. Specifically, examination of the coating overlay revealed a matrix of cored aluminum-rich dendrites and zinc-rich interdendritic constituents.

Investigations have determined that such aluminum-zinc alloy coatings age-harden by as much as 35 VHN with an attendant loss in ductility. This age hardening is classic in the sense that it involves the precipitation of a second phase coherent with the matrix, which causes an increase in hardness and a decrease in the ductility of the coating. The present invention, as disclosed by these specifications, evolved as a result of the desire to improve the ductility of the coating, thereby broadening the usefulness of aluminum-zinc alloy coated ferrous products.

SUMMARY OF THE INVENTION

This invention is directed to an aluminum-zinc alloy coated ferrous product having improved coating ductility, and to the process whereby such improved coating ductility may be realized. More particularly this invention relates to an as-cast aluminum-zinc alloy coated ferrous strip, where the coating overlay is characterized by a matrix of aluminum-rich dendrites and zinc-rich interdendritic constituents, which coated strip has been subjected to a thermal treatment at temperatures between about 200° F. (93° C.) and 800° F. (427° C.) for a period of time to effect metallurgical structure changes, among them being the precipitation of a second phase incoherent with the matrix.

BRIEF DESCRIPTION OF DRAWINGS

The FIGURE depicts data from a series of experiments showing the tendency to cracking by reverse-bending tests on as-cast aluminum-zinc alloy coated steel strip, as contrasted with identical experiments on aluminum-zinc alloy coated steel strip produced according to the present invention.

DETAILED DESCRIPTION OF INVENTION

This invention relates to an aluminum-zinc alloy coated ferrous product, such as produced by the continuous hot-dip coating of a steel strip, where the coating thereof has been thermally treated to improve its ductility. By aluminum-zinc alloy coatings we intend to include those coatings covered by U.S. Pat. Nos. 3,343,930; 3,393,089; 3,782,909; and 4,053,663, each of which was noted previously. These aluminum-zinc alloy coatings comprise 25% to 70%, by weight aluminum, silicon in an amount of at least 0.5% by weight of the aluminum content, with the balance essentially zinc. Among the many coating combinations available within these ranges, an optimum composition is one consisting of 55% aluminum, balance zinc with about 1.6% silicon, hereinafter referred to as 55 Al-Zn.

Examination of a 55 Al-Zn coating reveals a structure having an overlay characterized as a cored dendritic structure with an aluminum-rich matrix and a zinc-rich interdentritic constituent, and an underlying intermetallic layer. Such a coating offers many of the advantages of the essentially single phase coatings such as zinc (galvanized) and aluminum (aluminized) without the disadvantages associated with such single phase coatings. However, one disadvantage which has been observed is that the as-cast aluminum-zinc alloy coating age-hardens, typically from about 105 to 140 VHN for 55 Al-Zn, in a period of from about two to six weeks. This increase in hardness results in a loss in coating ductility. As a consequence severe forming applications are in jeopardy.

The apparent culprit is a yet unidentified precipitate whose size is in the range of 2–8Å. The age hardening is due to the precipitation of a second phase coherent with the matrix. The present invention is based on the discovery of a method to allow the precipitation reaction to go to completion, resulting in the development of an incoherent, overaged microstructure. This thermally treated aluminum-zinc alloy coating, characterized by such microstructure, has improved ductility, hence improved formability.

The method of this invention is a thermal-treatment whereby as-cast aluminum-alloy coated steel is heated to a temperature between 200° F. (93° C.) and 800° F. (427° C.) for a minimum hold time at temperature as calculated by the following equation:

$$\log t = \frac{7102.4}{T} - 1104,$$

where
T = heating temperature in °K.
t = minimum holding time in seconds. Approximate minimum times according to this equation are 7 days at 300° F. (149° C.), 2 hours at 400° F. (205° C.), and 1 second at 700° F. (371° C.) and higher.

For a thermal-treatment according to this invention at temperatures up to 400° F. (205° C.), the coated and thermally-treated product may be cooled to ambient temperature in still air. However, for a thermal-treatment according to this invention between 400° F. (205° C.) and 800° F. (427° C.), cooling rate must be slower than still air cooling, down to at least 400° F. (205° C.), to insure maximum ductility. By slow cooling we mean a rate no faster than about 1° F./minute—this prevents redissolution of the solute which can cause re-age hardening. In those instances where maximum ductility is not required, a partially thermally treated product may be obtained with processing parameters outside the aforementioned limits.

To demonstrate the effectiveness of this invention to produce an aluminum-zinc alloy coated ferrous product having a highly ductile coating, a series of reverse-bending tests were conducted on three different gauges of aluminum-zinc alloy coated steel sheet. The test procedure included bending aluminum-zinc coated steel sheet, in the as-cast condition and the overaged condition, 180° around various diameter mandrels and then opening such sheet and flattening them to their original flat shape. Observations from an examination of the inside bend of each test sheet are graphically illustrated in the FIGURE. Actual visual observations, with test parameters and coating hardness, are reported in Table I.

TABLE I

REVERSE-BENDING TESTS ON 55 AL—ZN

| Sheet Ga. (Inches) | Mandrel Dia. (Inches) | Al—Zn Coating (As Cast) | | Al—Zn Coating (Thermally Treated)[1] | |
|---|---|---|---|---|---|
| | | Hardness[2] (VHN) | Cracking Tendency[3] | Hardness (VHN) | Cracking Tendency |
| .061 | .047 | 143 | 6 | 106 | 4 |
| | .094 | | 5 | | 3 |
| | .125 | | 4 | | 2 |
| | .375 | | 3 | | 1 |
| | .500 | | 2 | | 0 |
| .031 | .047 | 133 | 3 | 115 | 2 |
| | .094 | | 2 | | 1 |
| | .125 | | 1 | | 0 |
| | .375 | | 0 | | 0 |
| | .500 | | 0 | | 0 |
| .019 | .047 | 129 | 1 | 105 | 0 |
| | .094 | | 0 | | 0 |
| | .125 | | 0 | | 0 |
| | .375 | | 0 | | 0 |
| | .500 | | 0 | | 0 |

[1] thermal treatment conducted at 400° F. (205° C.) for 3 hours
[2] average hardness of three mid-value tests out of five total tests
[3] Cracking tendency scale:
6 - severe cracking with flaking of coating overlay
5 - extra large cracks
4 - large cracks
3 - medium cracks
2 - fine cracks
1 - micro cracks
0 - no visible cracking The thermally treated and corrosion resistant product of this invention, as demonstrated in the data above, is a metallic coated ferrous product having a metallic coating consisting of an intermetallic layer adjacent the ferrous base and a highly ductile overlay of an alloy of aluminum and zinc. Through the thermal treatment of this invention the coating overlay has an average hardness which is typically about 30 to 35 VHN points below the conventionally produced as-cast aluminum-zinc alloy coating. The highly ductile nature of the coating overlay is evidenced by hardness values no greater than about 115 VHN, and preferably less than about 110 VHN.

We claim:

1. A thermally treated metallic coated ferrous base product having a ductile coating, characterized by an intermetallic layer adjacent said ferrous base and a coating overlay, whereby said overlay (1) comprises by weight, 25 to 70% aluminum, balance essentially zinc with a small addition of silicon, (2) contains precipitates of incoherent, overaged second phase particles, and (3) has a hardness no greater than about 115 VHN.

2. The metallic coated ferrous base product according to claim 1, characterized by an overlay hardness no greater than about 110 VHN.

* * * * *